United States Patent [19]
Fujimoto et al.

[11] Patent Number: 5,684,353
[45] Date of Patent: Nov. 4, 1997

[54] VIBRATION DRIVEN MOTOR

[75] Inventors: Kazuki Fujimoto; Ryuji Suzuki, both of Kawasaki; Jun Tamai, Yokohama, all of Japan

[73] Assignee: Canon Kabushiki Kaisha, Tokyo, Japan

[21] Appl. No.: 129,579

[22] Filed: Sep. 30, 1993

Related U.S. Application Data

[63] Continuation of Ser. No. 770,898, Oct. 4, 1991, abandoned.

[30] Foreign Application Priority Data

Oct. 5, 1990 [JP] Japan ................................. 2-267641

[51] Int. Cl.$^6$ ........................................... H01L 41/08
[52] U.S. Cl. ............................................. 310/323
[58] Field of Search ........................... 310/323, 325, 310/328

[56] References Cited

U.S. PATENT DOCUMENTS

| | | | |
|---|---|---|---|
| 4,645,964 | 2/1987 | Hiramatsu et al. | 310/323 |
| 4,663,556 | 5/1987 | Kumada | 310/323 X |
| 4,697,117 | 9/1987 | Mishiro | 310/323 |
| 4,728,843 | 3/1988 | Mishiro | 310/323 |
| 4,742,260 | 5/1988 | Shimizu et al. | 310/323 |
| 4,812,697 | 3/1989 | Mishiro | 310/323 |
| 4,831,305 | 5/1989 | Mukohjima et al. | 310/323 |
| 4,857,793 | 8/1989 | Okuno | 310/328 |
| 4,893,045 | 1/1990 | Honda | 310/323 |
| 4,933,590 | 6/1990 | Inoue et al. | 310/323 |
| 4,945,275 | 7/1990 | Honda | 310/323 |
| 4,947,076 | 8/1990 | Kumada | 310/323 |
| 4,965,482 | 10/1990 | Ohnishi et al. | 310/323 |
| 4,975,614 | 12/1990 | Honda | 310/323 |
| 5,039,899 | 8/1991 | Yamaguchi | 310/323 |
| 5,043,956 | 8/1991 | Tsukada et al. | 310/323 X |
| 5,055,732 | 10/1991 | Umemura | 310/323 |
| 5,101,132 | 3/1992 | Yamaguchi | 310/323 |
| 5,115,161 | 5/1992 | Myohga et al. | 310/323 |
| 5,122,700 | 6/1992 | Tamai et al. | 310/323 |
| 5,231,325 | 7/1993 | Tami et al. | 310/323 |
| 5,274,295 | 12/1993 | Tsukimoto | 310/325 X |
| 5,428,260 | 6/1995 | Suzuki | 310/323 |
| 5,436,522 | 7/1995 | Tsukimoto et al. | 310/323 |
| 5,506,462 | 4/1996 | Tamai et al. | 310/323 X |

FOREIGN PATENT DOCUMENTS

| | | |
|---|---|---|
| 0365231 | 4/1990 | European Pat. Off. . |
| 0406843 | 9/1991 | European Pat. Off. . |
| 0469881 | 2/1992 | European Pat. Off. . |
| 89173528 | 7/1989 | Japan . |

OTHER PUBLICATIONS

European Search Report dated Aug. 4, 1994.

*Primary Examiner*—Mark O. Budd
*Attorney, Agent, or Firm*—Fitzpatrick, Cella, Harper & Scinto

[57] ABSTRACT

In a vibration driven motor, a support member for supporting one end of a pressing member which presses a vibration member and a moving member receiving a drive force from the vibration member is fixed to a fixing member, with a result that the vibration member is indirectly supported.

34 Claims, 11 Drawing Sheets

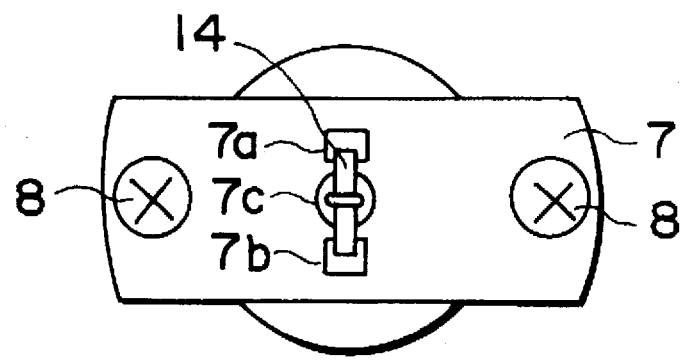
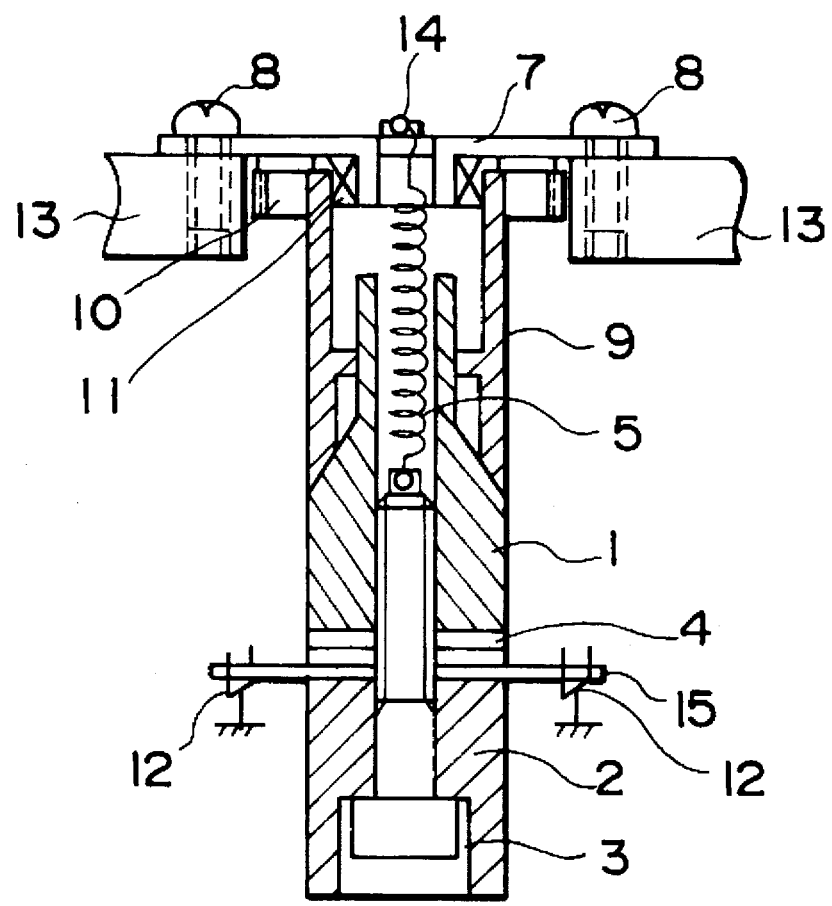

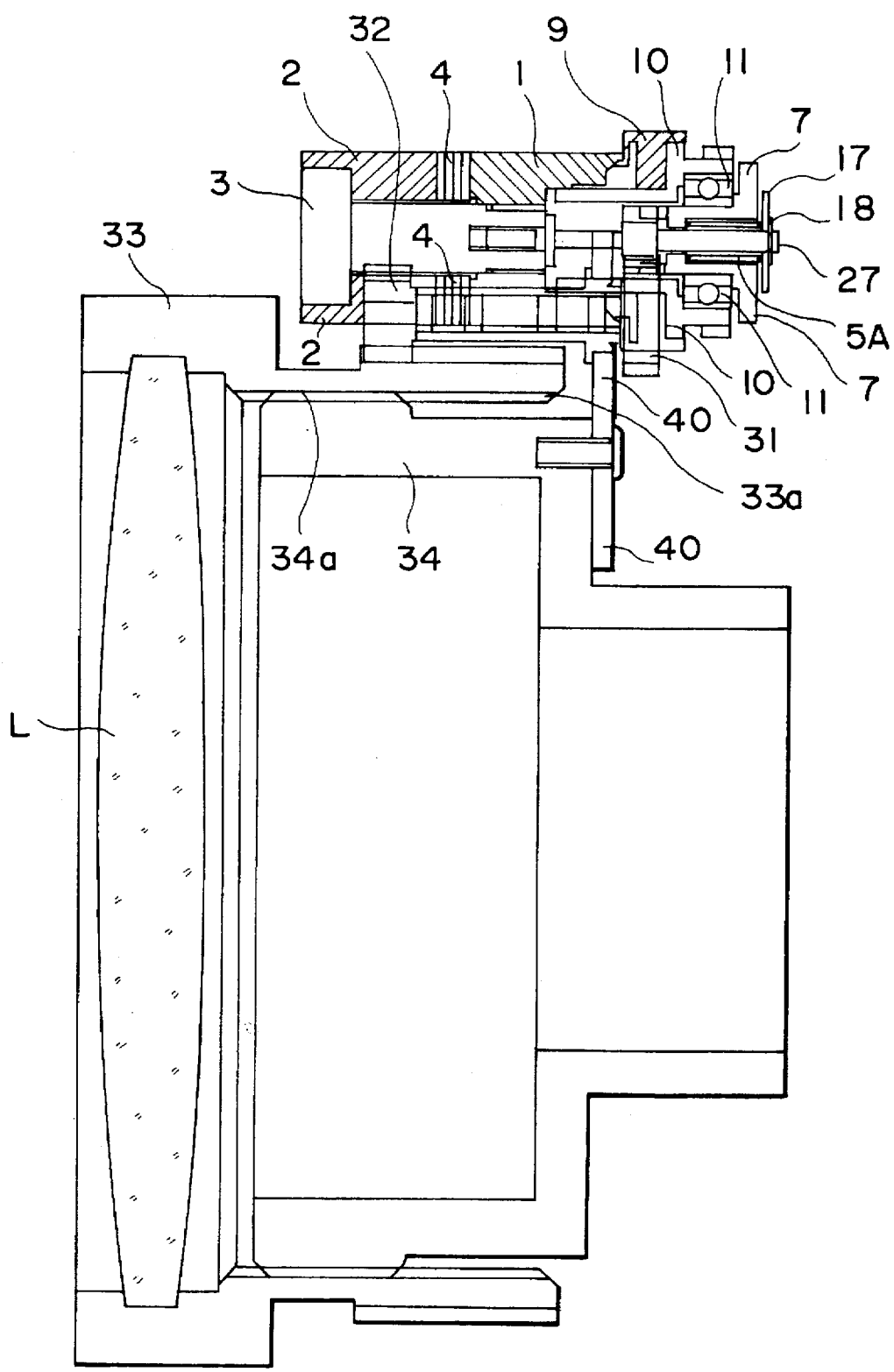

VIBRATION DRIVEN MOTOR

This application is a continuation of application Ser. No. 07/770,898 filed Oct. 4, 1991 now abandoned.

BACKGROUND OF THE INVENTION

1. Field of the Invention

This invention relates to an ultrasonic motor in which electric energy is supplied to an electro-mechanical energy conversion element provided on a bar-like resilient member to thereby vibrate the resilient member as a bar-like vibration member and cause circular or elliptical motion at the material point of the vibration member, thus frictionally driving a moving member pressed against the vibration member, and particularly to a supporting method for an ultrasonic motor suitable for use in an optical instrument such as a camera and a business machine such as a printer.

2. Related Background Art

Ultrasonic motors of the type in which a bending vibration is caused in a circular ring-like resilient member and a moving member for driving a lens is driven by a frictional force have heretofore been put into practical use in AF mechanisms for cameras. However, the ultrasonic motors of this conventional type are ring-shaped and therefore are relatively costly as a unit including a pressing mechanism, and are disadvantageous in cost relative to motors which need not be hollow. So, a motor of the type which is solid and easy to construct the pressing system, etc. has been recently proposed in Japanese Patent Application No. 1-173528 or U.S. application Ser. No. 533,534 (filed on Jun. 5, 1990) by the present applicant.

FIGS. 5 and 6 of the accompanying drawings show the ultrasonic motor thus proposed, and the supporting of the vibrator 1 of this proposed bar-like ultrasonic motor has been accomplished by sandwiching a supporting electrode plate 22 between two piezo-electric elements (for example, PZTs) 4 as electro-mechanical energy conversion elements and a sandwiching member 2 which cooperates with the vibrator 1 to constitute a vibration member, and fixing the electrode plate 22 to a fixed member 25 by means of screws 26 or the like. The reference numeral 3 designates a bolt for bringing the vibrator 1 and the sandwiching member 2 into engagement with each other with the piezo-electric elements 4 and the electrode plate 22 interposed. The reference numeral 24 denotes springs for urging washers 23 against the electrode plate 22. The shape of the supporting electrode plate 22 is a shape having flange portions on the end portions thereof as shown in FIG. 5, and holes into which the screws 26 are fitted are of a diameter larger than the outer diameter of the screws 26.

Now, in the case of an ultrasonic motor of the construction as described above, it is necessary to endow the direction of vibration, chiefly the direction perpendicular to the axis of the vibration member 1, 2, with a degree of freedom in order to maintain the vibration characteristic of the vibration member 1, 2. For this reason, the screws 26 for fixing the vibration member cannot be completely fastened.

As a result, there has been the problem that during the driving of the motor, the supporting electrode plate 22 shifts right and left (the direction perpendicular to the axis of the vibration member 1, 2) and the efficiency of the motor fails to increase due to the friction created between the electrode 22 and the washers 23 when the shift takes place.

SUMMARY OF THE INVENTION

It is an object of the present invention to provide an ultrasonic motor or a vibration driven motor which solves the above-noted problem.

It is another object of the present invention to provide an ultrasonic motor or a vibration driven motor which suffers little reduction in efficiency due to its support structure.

One aspect of the application is to fix to a fixing member a support member for supporting one end of a pressing member which presses a vibration member and a moving member receiving a drive force from the vibration member, with a result that the vibration member is indirectly supported.

Other objects of the present invention will become apparent from the following detailed description of the invention.

BRIEF DESCRIPTION OF THE DRAWINGS

FIGS. 7 and 8 are a plan view of an ultrasonic motor according to another embodiment of the present invention and a construction view, respectively, of the essential portions thereof.

FIGS. 20 and 21 show the construction of the essential portions of a camera to which the bar-like ultrasonic motor of the present invention is applied.

DETAILED DESCRIPTION OF THE PREFERRED EMBODIMENTS

Figure 1:
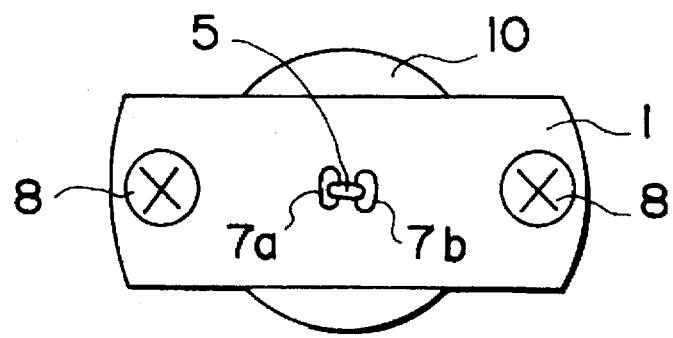
FIG. 1 is a plan view of an embodiment of the ultrasonic motor of the present invention.
Figure 2:
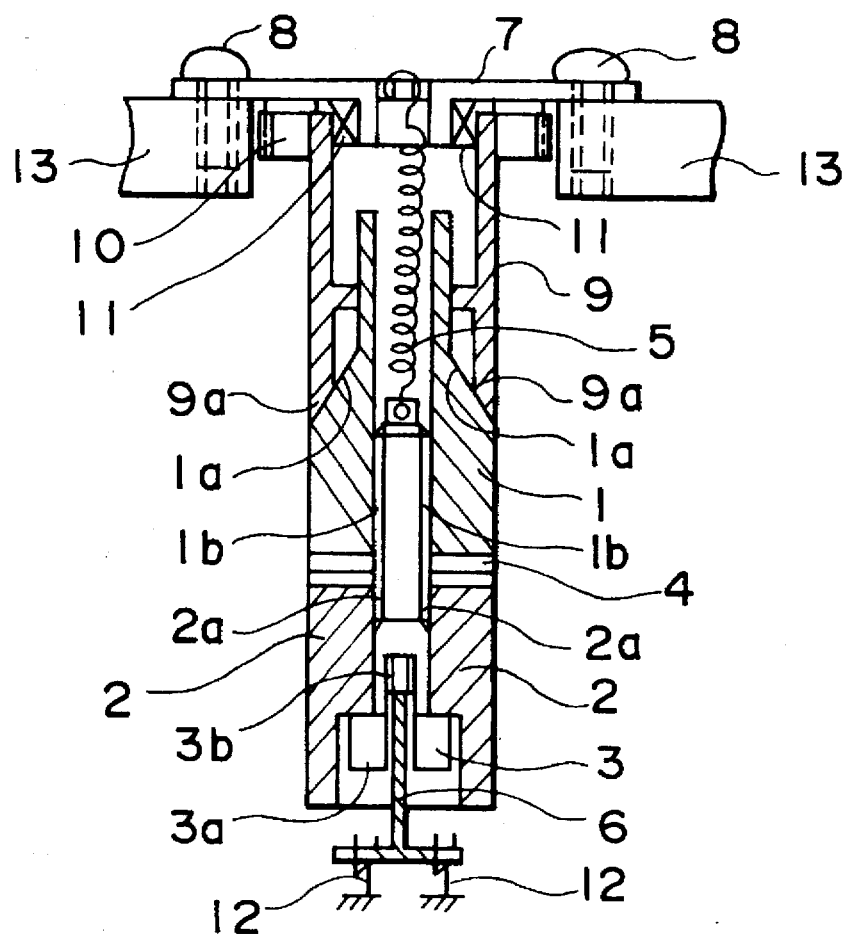
FIG. 2 shows the construction of the essential portions of the motor shown in FIG. 1.

FIG. 1 is a plan view of an ultrasonic motor (or a vibration driven motor) for a camera according to a first embodiment of the present invention, and FIG. 2 shows the construction of the essential portions of the FIG. 1 motor.

Figure 5:
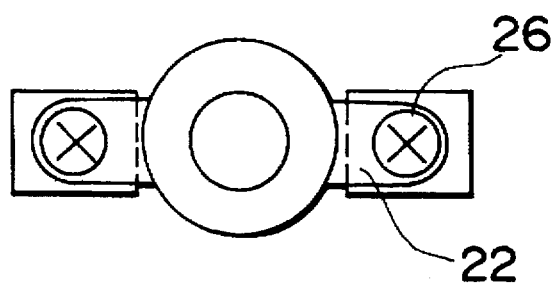
FIGS. 5 and 6 are a plan view of an ultrasonic motor according to the prior art and a construction view, respectively, of the essential portions thereof.
Figure 6:
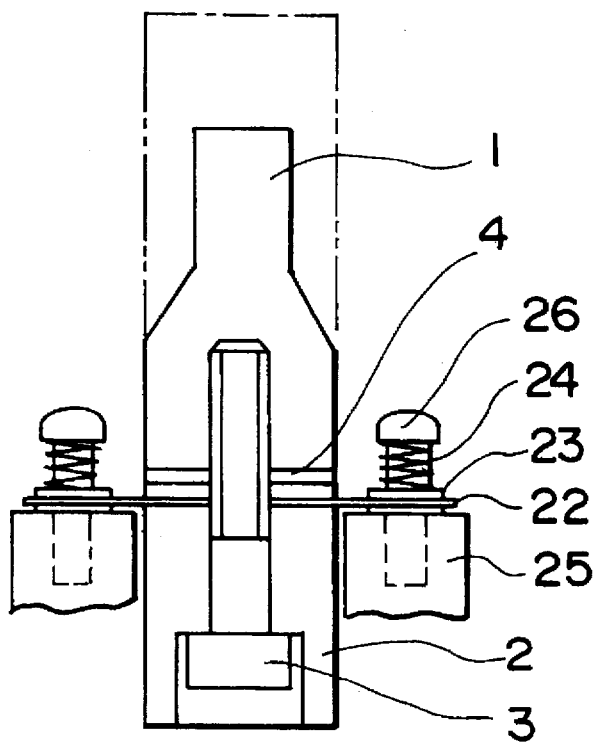

The motor will now be described, but in each of the following embodiments, elements functionally similar to those of the motor shown in FIGS. 5 and 6 are given similar reference numerals and need not be described.

The reference numeral 1 designates a metallic cylindrical vibrator functionally similar to the vibrator shown in FIG. 6 and having an inclined portion $1a$ for transmitting a drive force to the inclined portion $9a$ of a rotational member 9, and a threaded portion $1b$ with which a bolt 3 is threadably engaged. The reference numeral 2 denotes a metallic cylindrical sandwiching member functionally similar to the sandwiching member shown in FIG. 6 and also having a thread portion $2a$ with which the bolt 3 is threadably engaged. The bolt 3 is one for enabling two piezo-electric elements 4 to be sandwiched between the vibrator 1 and the sandwiching member 2, and the head $3a$ of the bolt 3 is formed with a hole of a predetermined depth, to the end of which is fixed the tip end of a bolt fixing pin 6. The pin 6 cooperates with a detent 12 fixed to a predetermined member of a camera to restrict the rotation of the vibration member 1, 2 within a predetermined range.

Figure 3:
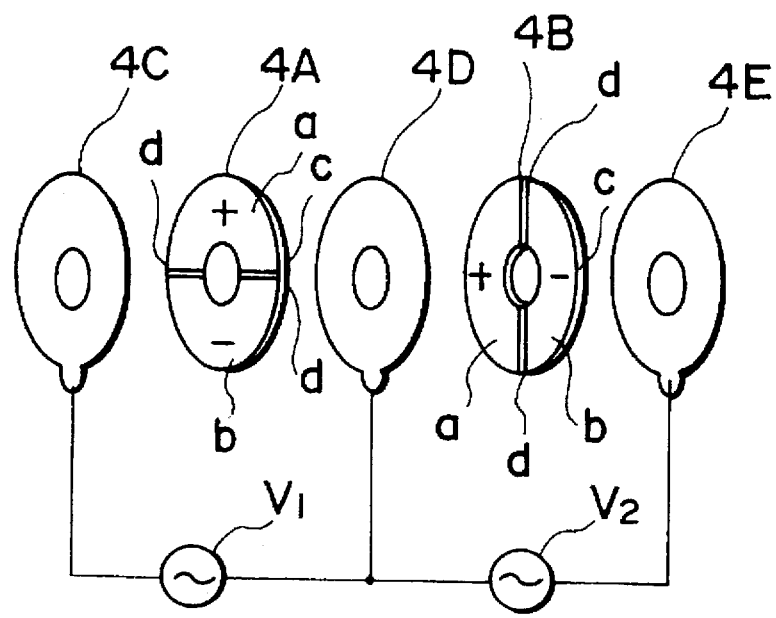
FIG. 3 shows the arrangement of the piezo-electric elements and electrodes of the motor shown in FIG. 1.

When the diameter of the vibration member 1, 2 is 10 mm, the diameter of the pin 6 is 1 mm and the diameter of the tip end portion 3b of the pin 6 is made as small as 1.4–2.0 mm, and the structure of this portion is designed not to adversely affect the vibration characteristic of the vibration member 1, 2. The construction of the aforementioned two piezo-electric elements 4 is as shown in FIG. 3. The piezo-electric elements 4 are comprised of two piezo-electric elements 4A and 4B (or alternatively may be comprised of four piezo-electric elements), and in each of the piezo-electric elements 4A and 4B, two electrodes (plus electrode a and minus electrode b) differing in the direction of polarization from each other and polarized in the direction of thickness are symmetrically formed on one side thereof at the opposite sides of an insulating portion d formed at the center axis position and the common electrode c of the plus electrode a and the minus electrode b is formed on the other side thereof, and these piezo-electric elements 4A and 4B are disposed with a positional phase difference of 90° therebetween with respect to the axis of the vibration member 1, 2.

The reference numeral 5 designates a spring as a pressing member having one end thereof fixed to the end of the bolt 3 and having the other end thereof fixed to a fixing flange 7. By the biasing force of the spring 5, the vibration member 1, 2 is rotatably brought into frictional contact with the rotational member 9 as a moving member with the inclined portions 1a and 9a as the point of contact. The reference numeral 8 denotes screws for fastening the fixing flange 7 as a support member to a fixing member 13 which is a portion of the camera. The reference numeral 10 designates a gear for transmitting the rotational force of the rotational member 9 to the spool of the camera, and the reference numeral 11 denotes bearings for cutting off the transmission between the rotational member 9 and the fixing flange 7 and for preventing the fixing of the motor by the fixing flange 7, the screws 8 and the fixing member 13 from affecting the vibration member 1, 2.

The operation of the motor constructed as described above will now be described.

A voltage $V_1$ is applied from an AC voltage source $V_1$ to between an electrode plate 4D and an electrode plate 4C and a voltage $V_2$ is applied from an AC voltage source $V_2$ to between the electrode plate 4D and an electrode plate 4E, whereby there are generated a vibration by the expansion and contraction displacement of the piezo-electric element 4A in the direction of thickness thereof and a vibration by the expansion and contraction displacement of the piezo-electric element 4B in the direction of thickness thereof, and these vibrations are combined by the vibration member 1, 2, which is thus vibrated. In other words, the first energy conversion member 4A generates a first bending vibration having a first direction in the vibration member 1, 2 in response to an applied first electrical signal $V_1$ and the second energy conversion member 4B generates a second bending vibration having a second direction different from the first bending vibration in response to an applied second electrical signal $V_2$, whereby a combined vibration of the first bending vibration and the second bending vibration is caused in the vibration member 1, 2.

Figure 4:
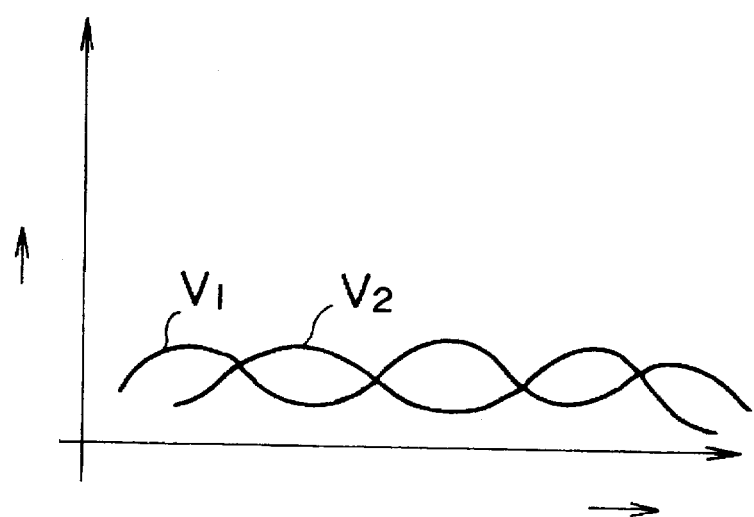
FIG. 4 shows the waveforms of AC voltages applied to the piezo-electric elements shown in FIG. 3.

The AC voltage $V_1$ and the AC voltage $V_2$, as shown in FIG. 4, are the same in amplitude and frequency and have a time phase difference of 90° therebetween.

Thus, the vibration member, as previously described, makes a circular motion like the bending and stretching of a skipping rope (hereinafter referred to as the rope skipping vibration). The principle on which this circular motion is created is known and need not be described herein.

In the case of this embodiment, the vibration member is indirectly fixed at a predetermined position and therefore, even if the motor is firmly fixed by the screws 8, the efficiency loss of the motor is small, or in other words, there is provided a motor of good efficiency.

FIGS. 7 and 8 are a plan view of an ultrasonic motor for a camera according to a second embodiment of the present invention and a view showing the construction of the essential portions thereof, respectively. This embodiment is one in which a parallel pin 14 is used as the tip end side hook of the spring 5, thereby increasing the strength of the portion to which the hook is secured.

The fixing flange 7 in this embodiment has therein apertures 7a and 7b similar to apertures 7a and 7b formed in the fixing flange 7 shown in FIG. 1, and an aperture 7c through which the spring 5 is passed. The parallel pin 14 is extended from the aperture 7a to the aperture 7b. Also, the fixing flange 7 is made of resin which, from the viewpoint of vibration attenuation characteristics of vibration and prevents the wear and damage of the portion thereof to which the hook is secured.

As a detent for the vibration member 1, 2, use is made of a detent electrode 15 sandwiched between the sandwiching member 2 and the piezo-electric element 4. In the other points, the construction and operation of this embodiment are similar to those of the motor of the first embodiment and need not be described.

Figure 9:
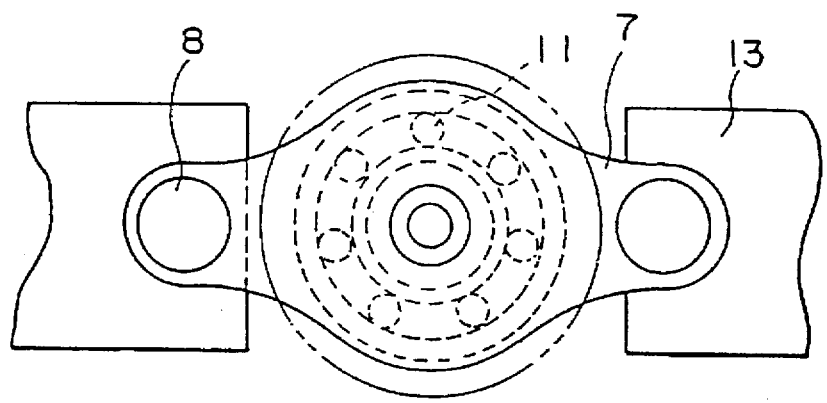
FIGS. 9 and 10 are a plan view of an ultrasonic motor according to still another embodiment of the present invention and a construction view, respectively, of the essential portions thereof.
Figure 10:
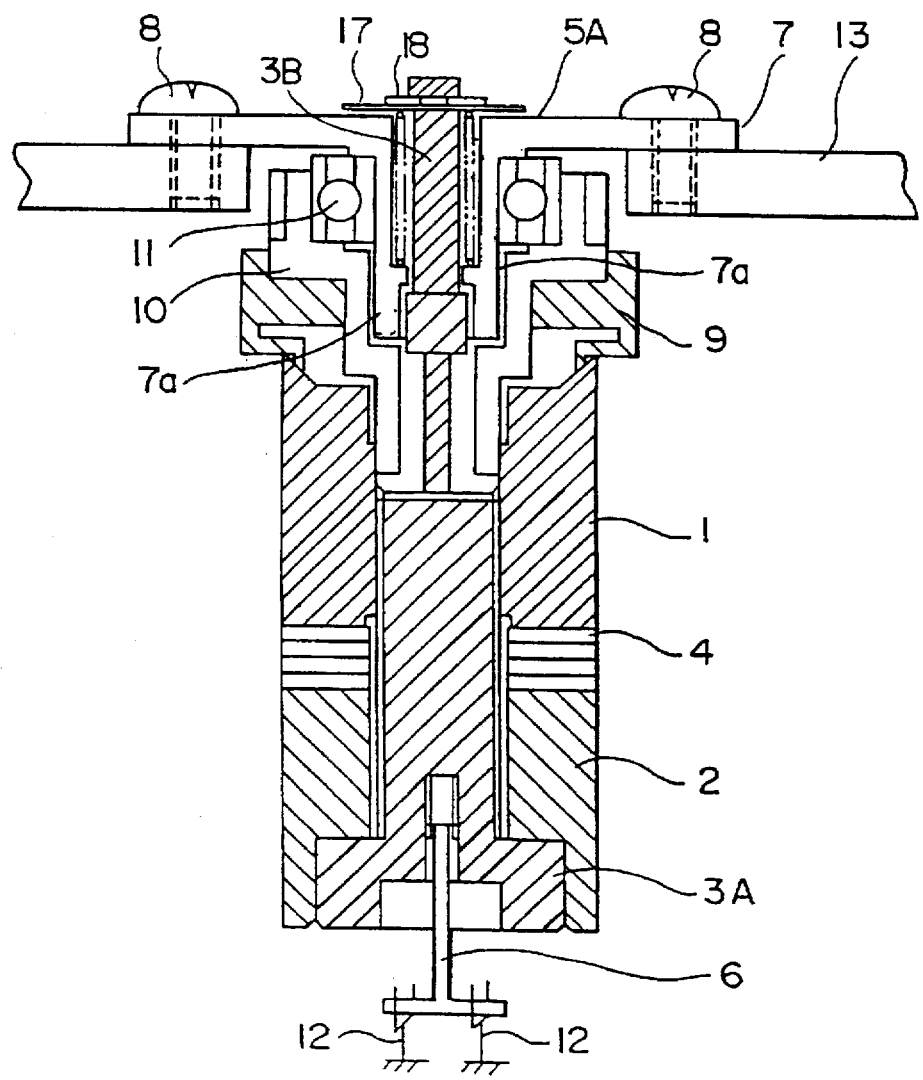

FIGS. 9 and 10 are a plan view of an ultrasonic motor according to a third embodiment of the present invention and a view showing the construction of the essential portions thereof, respectively. Regarding this and further embodiments, only the differences thereof from the aforedescribed embodiments will be described chiefly.

In this third embodiment, the spring for pressing the rotational member is changed from a tension coil spring to a compression coil spring 5A. Thereby the assemblage of the motor becomes much easier.

Because of the spring 5A being used, the fixing flange 7 has a level difference portion 7a against which the spring 5A bears, as shown in FIG. 10. The reference numeral 17 designates a washer against which one end of the spring 5A bears. The reference numeral 18 denotes an E-shaped ring. The reference character 3A designates a bolt having the function of the aforedescribed bolt 3. Bolt 3A is threadably engaged with vibration member 2 and includes a central stem 3B coupled thereto and extending therefrom to form a supporting member. As shown, the supporting member (including spring 5a) is located substantially on a side of rotational member 9 opposite the vibration member, and the central stem 3B performs the functions of transmitting the spring force of the spring 5A to the rotational member 9 through the fixing flange 7, and bringing the rotational member 9 into frictional engagement with the vibration member 1, 2.

Figure 11:
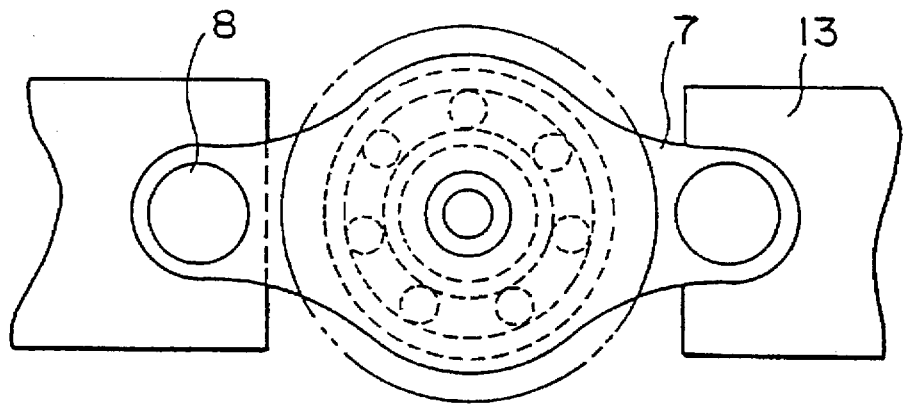
FIGS. 11 to 19 are plan views of ultrasonic motors according to still further embodiments of the present invention and construction views, respectively, of the essential portions thereof.
Figure 12:
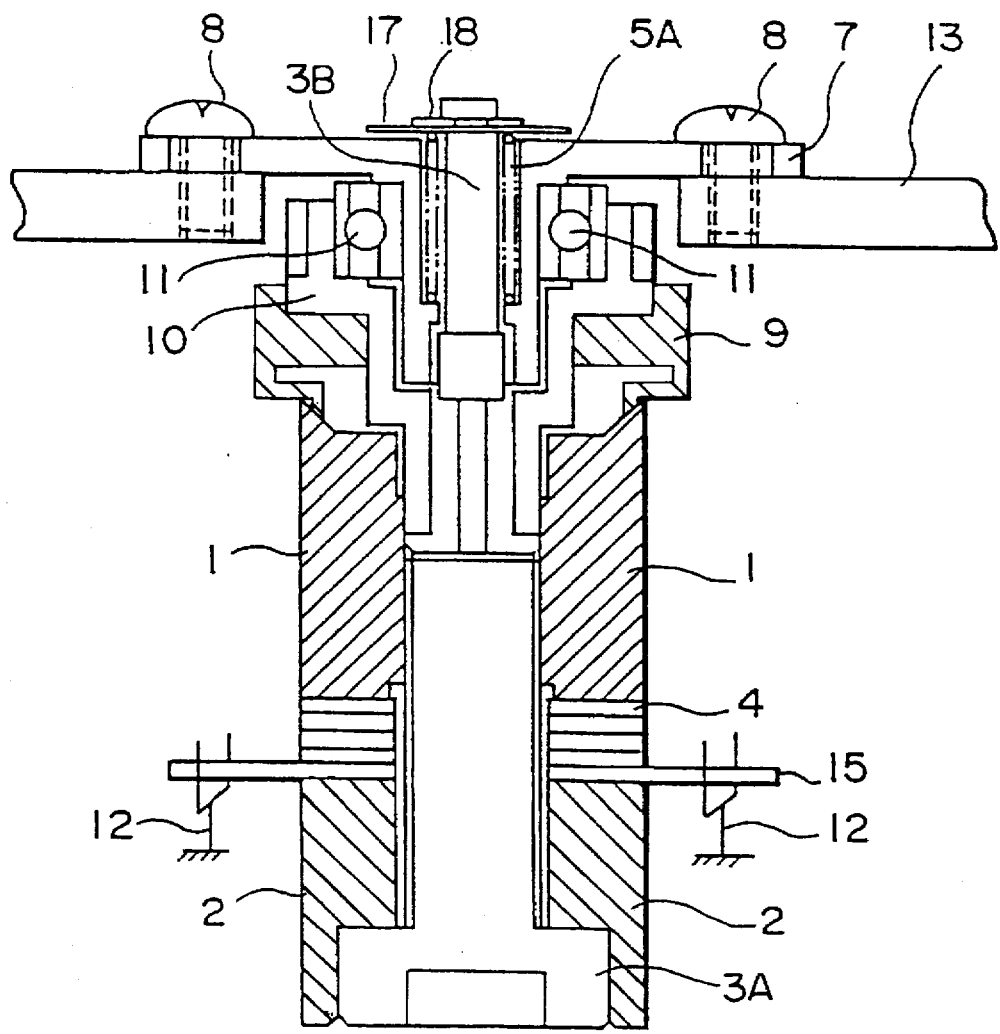

FIGS. 11 and 12 are a plan view of an ultrasonic motor according to another embodiment of the present invention and a view showing the construction of the essential portions thereof, respectively. This embodiment adopts a combination of the system of the FIG. 10 embodiment in which the pressing force is created by the compression spring 5A and the detent system by the electrode plate 15 shown in FIGS. 7 and 8.

Figure 13:
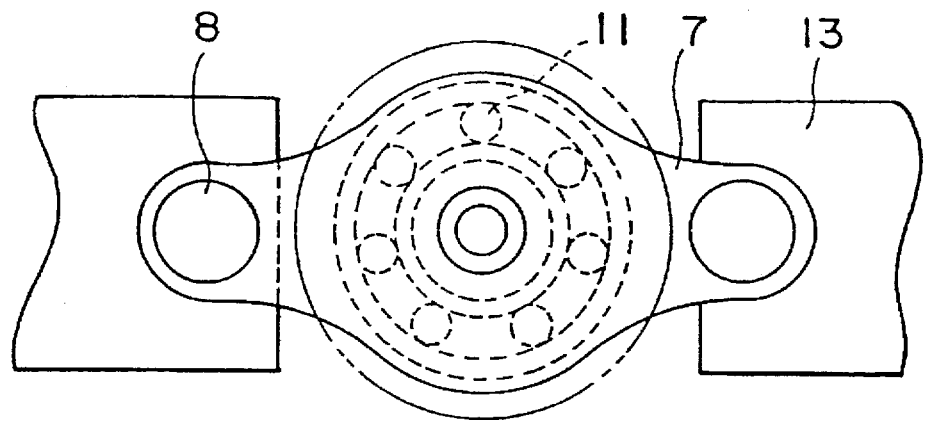
Figure 14:
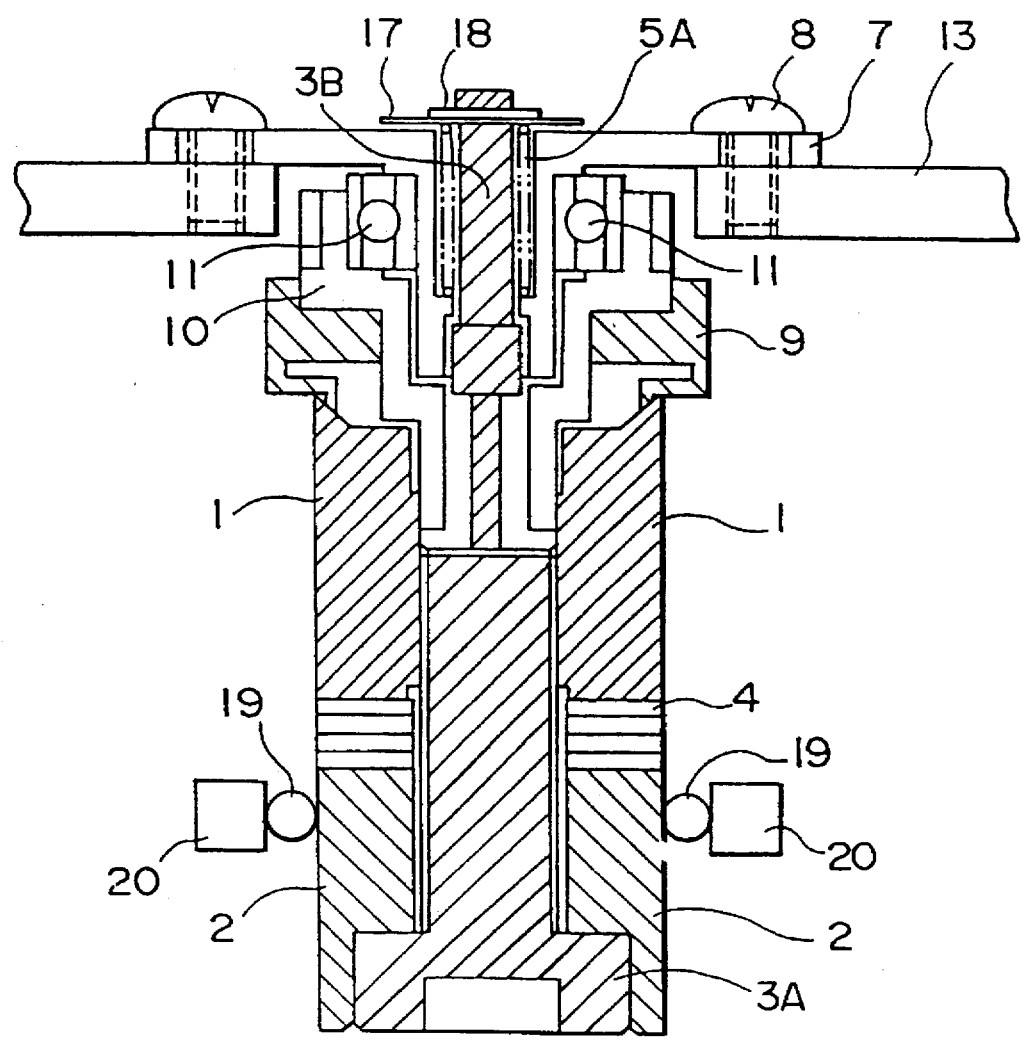

FIGS. 13 and 14 are a plan view of an ultrasonic motor according to still another embodiment of the present invention and a view showing the construction of the essential portions thereof, respectively. This embodiment is one in which a circular soft rubber ring 19 is wound on the mode position which seems to least affect the vibration of the vibration member and a fixing member 20 is provided at a predetermined position and fixed so as to embrace the rubber ring 19.

By the soft rubber ring 19 being employed, a degree of freedom is given in the directions other than the direction of rotation of the vibration member.

Figure 15:
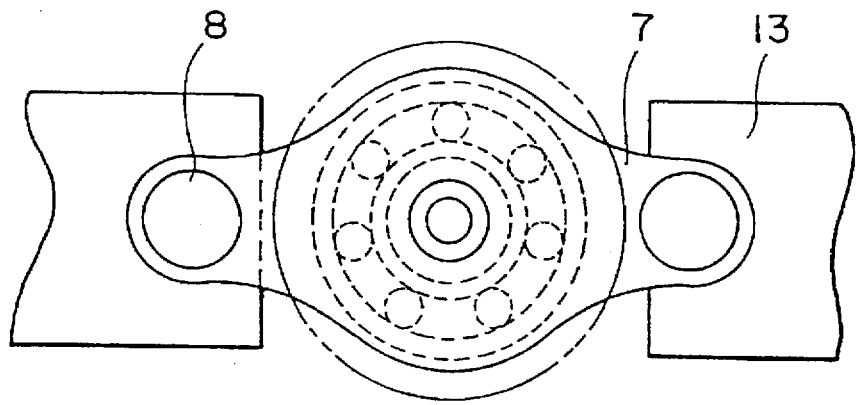
Figure 16:
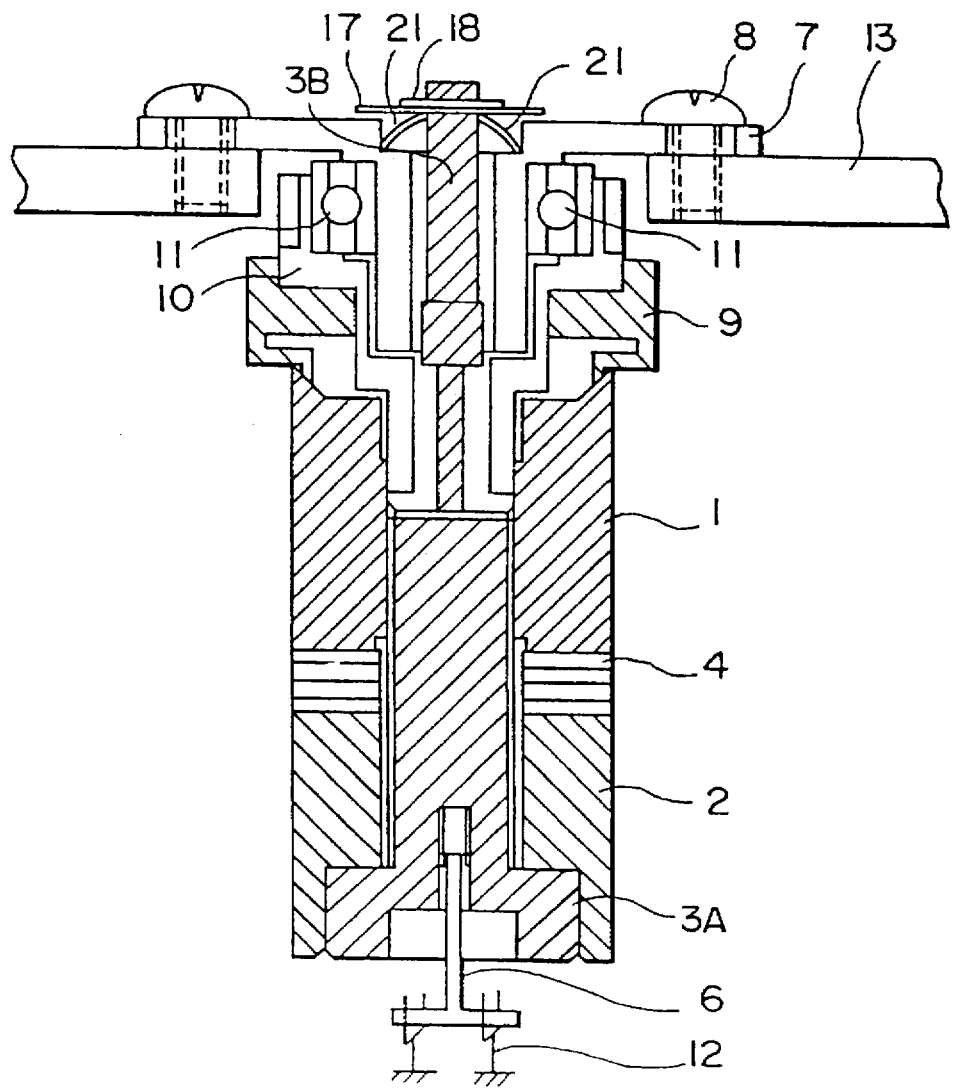

FIGS. 15 and 16 are a plan view of an ultrasonic motor according to another embodiment of the present invention and a view showing the construction of the essential portions thereof, respectively. This embodiment is one substantially similar to the embodiment of FIGS. 9 and 10 and in which a belleville spring 21 is employed in lieu of the compression coil spring 5A shown in FIG. 10 to thereby achieve a reduction in cost.

Figure 17:
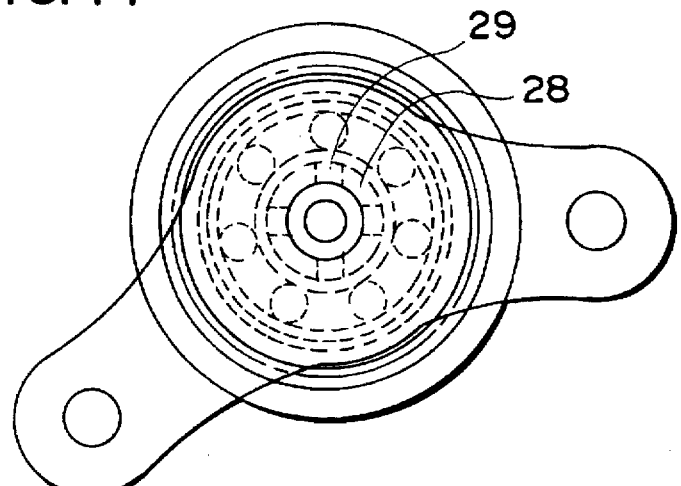
Figure 18:
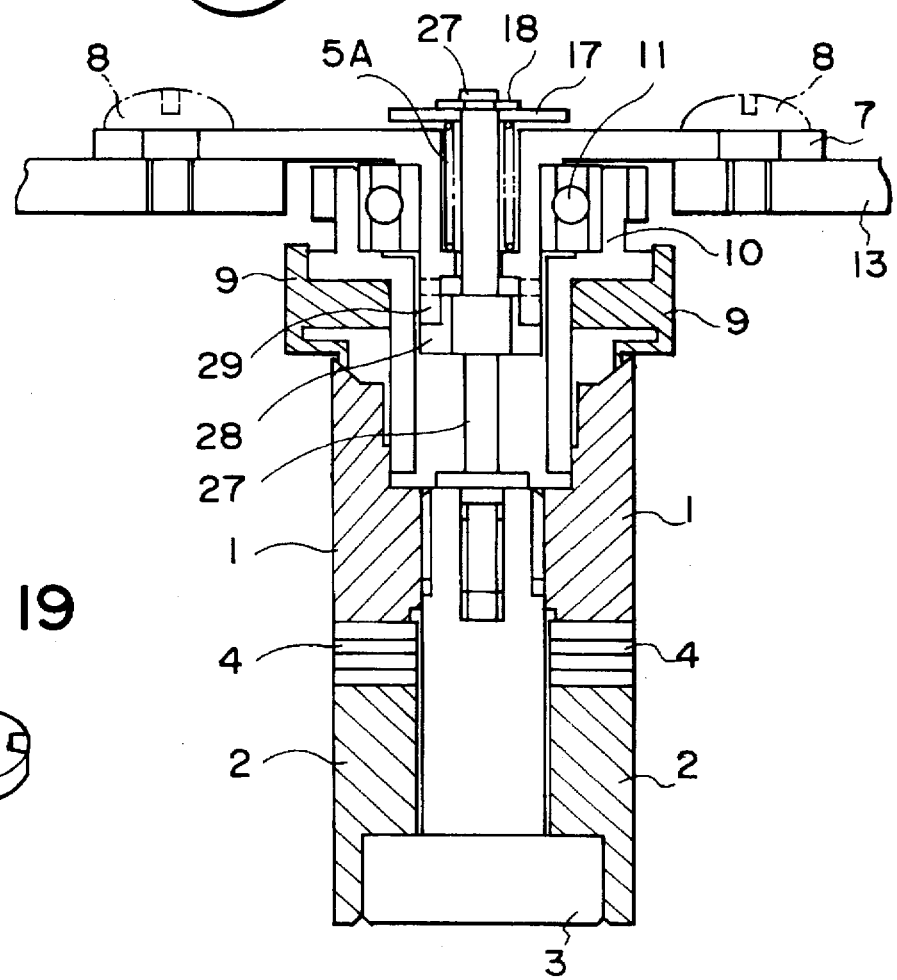
Figure 19:
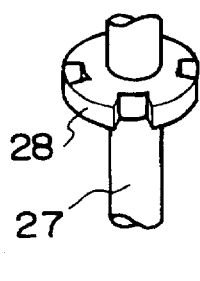

FIGS. 17 to 19 are a plan view of an ultrasonic motor according to another embodiment of the present invention, a view showing the construction of the essential portions thereof and a fragmentary perspective view of a pin shown in FIG. 18, respectively. This embodiment is one in which the bolt 3A in the embodiment of FIG. 10 is constructed of a bolt 3 (see FIG. 18) and a pin 27 threadably engaged with the threaded portion of the bolt 3. The pin 27, as shown in FIG. 19, has a diametrically protruding projection 28 in the intermediate portion thereof, and this projection 28 is constructed so as to mesh with the projection 7b of the fixing flange 7. The rotation of the vibration member 1, 2 is restricted by this meshing.

Figure 20:
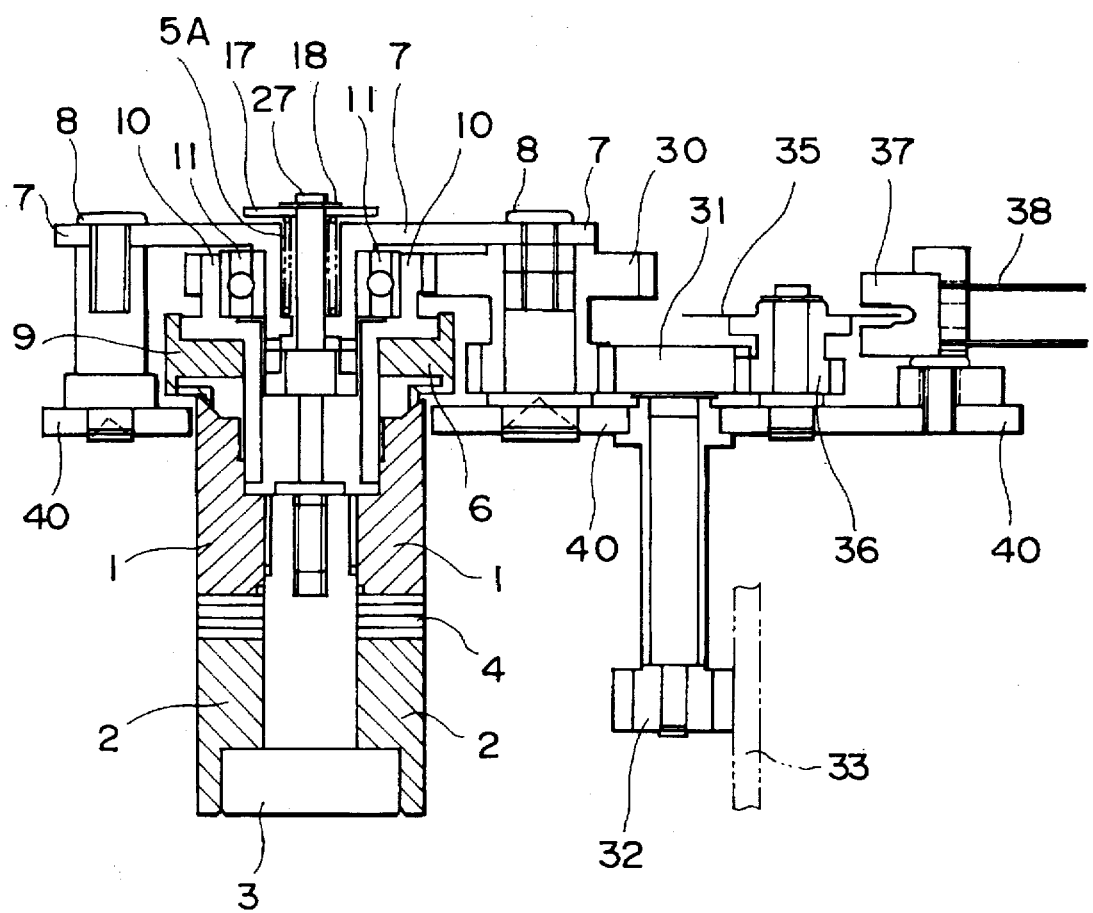

FIG. 20 is a view showing the construction of the essential portions of an ultrasonic motor for a camera according to another embodiment of the present invention.

In FIG. 20, the reference numeral 7 designates a fixing flange secured to the ground plate 40 of a camera by means of a screw 8, and the reference numeral 9 denotes a rotational member rotated by the drive force of a vibrator 1. The rotational force of the rotational member 9 is transmitted to the rotary cylinder 33 of the camera through a gear 10 rotated with the rotational member 9, a gear 30 meshing with the gear 10, a gear 31 meshing with the gear 30, and a gear 32 fitted to the gear 31. The reference numeral 36 designates a gear meshing with the gear 31 and having secured thereto a pulse plate 35 for detecting the position and speed of the rotary cylinder. The reference numeral 37 denotes a conventional photocoupler for detecting the position and speed of the pulse plate 35. The reference numeral 38 designates a lead wire connected to the photocoupler 37. The lead wire 38 is connected to the lens control circuit (not shown) of the camera.

The operation of the motor of the above-described construction will now be described.

When AC voltages are applied from a conventional driving circuit, not shown, to four piezo-electric elements 4, the vibration member 1, 2 is given a vibration conforming to the electrical phase difference between the applied AC voltages in a plurality of planes conforming to the polarized states of the piezo-electric elements 4 by the piezo-electric elements 4. Therefore rotational motion is transmitted to the surface portions of the vibration member 1, 2 and, as a result, the rotational member 9 receives a drive force from the inclined portion of the vibrator 1 and is rotated. Therefore, the gear 32 is rotated through the gears 10, 30 and 31, and the rotary cylinder 33 meshing with the gear 32 is also rotated. With the rotation of the rotary cylinder 33, the optical system (not shown) of the photo-taking lens of the camera, not shown, is moved for focus adjustment.

FIG. 21 is a view showing the construction of the essential portions of the photo-taking lens of a camera to which the ultrasonic motor of the present invention is applied.

This embodiment is substantially the same as the camera of the embodiment shown in FIG. 20, and is designed such that the aforedescribed rotary cylinder 33 meshes with a gear 32 operatively associated with the rotation of the rotational member 9 and the helicoid portion 33a thereof is helicoid-coupled to the helicoid portion 34a of a fixed cylinder 34. Also, this embodiment is one in which the rotary cylinder 33 is rotated in response to rotation of the rotational member 9, whereby the focusing optical system 1 of the photo-taking lens is moved along the optical axis thereof.

Since the vibration member is indirectly supported as described above, there is provided an ultrasonic motor in which reduction in efficiency by the supporting of the vibration member is eliminated.

What is claimed is:

1. A vibration driven motor comprising:
    a vibration member having an axis;
    a movable member coaxial with said vibration member and frictionally engaged with said vibration member;
    a first electro-mechanical energy conversion member functionally coupled to said vibration member for generating therein a first bending vibration having a first direction in said vibration member in response to a first applied electrical signal;
    a second electro-mechanical energy conversion member functionally coupled to said vibration member for generating therein a second bending vibration having a second direction different from the first direction in response to a second applied electrical signal, whereby a combined bending vibration of said first and second bending vibrations is generated in said vibration member, the combined bending vibration causing relative movement between said vibration member and said movable member; and
    a supporting structure comprising a central stem having one end disposed on a side of said movable member opposite said vibration member and the other end of said central stem extending through said movable member and at least a portion of said vibration member and engaging said vibration member thereby to support said vibration member, the supporting structure being provided on or substantially on the axis of said vibration member, said supporting structure also comprising a biasing member disposed substantially on the same side of said movable member as said one end of said central stem and biasing said vibration member to press contact said movable member.

2. A motor according to claim 1, wherein said supporting member comprises a threaded portion which engages with a threaded portion provided at a hollow portion of said vibration member.

3. A motor according to claim 1, wherein said supporting member includes a portion for engaging said vibration member and a spring connected to said portion and said fixed member, said spring biasing said vibration member to abut said movable member.

4. A motor according to claim 3, wherein said spring is a tension spring.

5. A motor according to claim 3, wherein said portion includes a bolt on an outer end thereof and having a thread which engages with a thread formed at a hollow portion of said vibration member.

6. A motor according to claim 2, wherein said movable member includes a gear for transmitting an output.

7. A motor according to claim 6, wherein said movable member engages said fixed member through a bearing member.

8. A motor according to claim 7, wherein said fixed member includes a fixed flange.

9. A motor according to claim 1, wherein each said conversion member is separated into first and second areas, said first and second areas respectively being polarized in different directions in a direction of thickness.

10. A motor according to claim 1, wherein said supporting member includes a threaded portion which engages a thread formed at a hollow portion of said vibration member and a flexible urging element provided between said threaded portion and said fixed member.

11. A motor according to claim 10, wherein said urging element includes a bar-shaped element integrally formed with said threaded portion and having a smaller diameter than a diameter of said threaded portion and a spring provided between a part of said bar-shaped element and said fixed member.

12. A motor according to claim 11, wherein the spring of said urging element is a compressed coil spring.

13. A motor according to claim 1, further comprising a member for restricting a range of deviation of said vibration member.

14. A vibration driven motor, comprising:
  a vibration member having an axis and including means for generating a bending vibration wave therein in response to an electrical signal applied thereto;
  a contact member frictionally engaging said vibration member and arranged to be driven by said bending vibration wave; and
  a supporting structure comprising a central stem having one end disposed on a side of said contact member opposite said vibration member and the other end of said central stem extending through said movable member and at least a portion of said vibration member and engaging said vibration member thereby to support said vibration member, said supporting structure also comprising a biasing member disposed substantially on the same side of said movable member as said one end of said central stem and generating an abutting force for relatively pressing said vibration member against said contact member, said supporting structure being located on or substantially on the axis of said vibration member.

15. A motor according to claim 14, further comprising a member for restricting a range of deviation of said vibration member.

16. A motor according to claim 14, wherein said vibration member includes a first bar-shaped vibration element having a contact surface for contacting said contact member, a second bar-shaped vibration element, and an electro-mechanical energy conversion element inserted between said first and second bar-shaped elements for generating a vibration wave in response to said applied electrical signal.

17. A motor according to claim 16, wherein said supporting member is a bolt having a head portion, a large diameter portion which extends from said head portion and engages a thread portion formed on at least one of said first and second vibration elements, and a small diameter portion extending from said large diameter portion.

18. A motor according to claim 17, wherein said second bar-shaped vibration element is pinched by a predetermined pressure between a terminal end of said conversion element and the head portion of said bolt.

19. A vibration driven motor, comprising:
  a vibration member having an axis;
  a movable member coaxial with said vibration member and frictionally engaged with said vibration member;
  a first electro-mechanical energy conversion member functionally coupled to said vibration member for generating therein a first bending vibration having a first direction in said vibration member in response to a first applied electrical signal;
  a second electro-mechanical energy conversion member functionally coupled to said vibration member for generating therein a second bending vibration having a second direction different from the first direction in response to a second applied electrical signal, whereby a combined bending vibration of said first and second bending vibrations is generated in said vibration member, the combined bending vibration causing relative movement between said vibration member and said movable member;
  a supporting structure comprising a central stem having one end disposed on a side of said movable member opposite said vibration member and the other end of said central stem extending through said movable member and at least a portion of said vibration member and engaging said vibration member thereby to support said vibration member, said supporting structure being provided on or substantially on the axis of said vibration member, said supporting structure also comprising a biasing member disposed substantially on the same side of said movable member as said one end of said central stem, said biasing member biasing the central stem to apply a pressure force between said vibration member and said movable member; and
  a member for restricting a deviation of said vibration member within a predetermined range.

20. A system driven by a vibration motor as a driving source, comprising:
  a vibration member having an axis and including means for generating a bending vibration wave therein in response to an electrical signal applied thereto;
  a movable member frictionally engaging said vibration member and arranged to be driven by said bending vibration wave;
  a supporting structure comprising a central stem having one end disposed on a side of said movable member opposite said vibration member and the other end of said central stem extending through said movable member and at least a portion of said vibration member and engaging said vibration member thereby to support said vibration member, said supporting structure also comprising a biasing member disposed substantially on the same side of said movable member as said one end of said central stem and generating an abutting force for relatively pressing said vibration member against said movable member, said supporting structure being provided on or substantially on the axis of said vibration member; and
  a transmitting member engaged with an output portion of said movable member for transmitting a movement of said movable member to a load of said system.

21. A vibration driven motor comprising:
  a vibration member having an axis;
  a movable member coaxial with said vibration member and frictionally engaged with said vibration member;
  a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating a second bending vibration therein having a second direction different from the first direction in response to a second applied electrical signal, whereby a combined bending vibration of said first and second bending vibrations is generated in said vibration member, the combined bending vibration causing relative movement between said vibration member and said movable member; and a supporting structure comprising a central stem having one end portion disposed at least substantially on a side of said movable member opposite said vibration member and another end portion of said central stem extending through said movable member and at least a portion of said vibration member and engaging said vibration member thereby to support said vibration member, said supporting structure also comprising a biasing member disposed substantially on the same side of said movable member as said one end of said central stem and biasing said vibration member to press contact said movable member, said supporting structure being provided on or substantially on the axis of said vibration member.

22. A system driven by a vibration motor as a driving source, comprising:

a vibration member having an axis;

a movable member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined bending vibration of said first and second bending vibrations is generated in said vibration member, the combined bending vibration causing relative movement between said vibration member and said movable member;

a supporting structure comprising a central stem having one end disposed on a side of said movable member opposite said vibration member and another end portion of said central stem extending through said movable member and at least a portion of said vibration member and engaging said vibration member thereby to support said vibration member, said supporting structure also comprising a biasing member disposed substantially on the same side of said movable member as said one end of said central stem and biasing said vibration member to press contact said movable member, said supporting structure being provided on or substantially on the axis of said vibration member; and a transmitting member engaged with an output portion of said movable member for transmitting a movement of said movable member to a load of said system.

23. A vibration driven motor comprising:

a vibration member having an axis;

a rotary member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined vibration of said first and second bending vibrations is generated in said vibration member, the combined vibration causing relative movement between said vibration member and said rotary member; and a supporting structure comprising a central stem having one end disposed on a side of said rotary member opposite said vibration member, the other end of said central stem extending through said rotary member and engaging said vibration member thereby to support said vibration member, the supporting structure being provided on or substantially on the axis of said vibration member and comprising a biasing member for biasing said vibration member to press contact said rotary member.

24. A vibration driven motor, comprising:

a vibration member having an axis and including means for generating a vibration wave therein in response to an electrical signal applied thereto;

a rotary member coaxial with said vibration member, frictionally engaging said vibration member and arranged to be driven by said vibration wave; and a supporting structure comprising a central stem having one end disposed on a side of said rotary member opposite said vibration member, the other end of said central stem extending through said rotary member and at least a portion of said vibration member and engaging said vibration member thereby to support said vibration member, said supporting structure also comprising a biasing member disposed substantially on the same side of said rotary member as said one end of said central stem and generating an abutting force for relatively pressing said vibration member against said rotary member, said supporting structure being located on or substantially on the axis of said vibration member.

25. A vibration driven motor, comprising:

a vibration member having an axis;

a rotary member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined vibration of said first and second bending vibrations is generated in said vibration member, the combined vibration causing relative movement between said vibration member and said rotary member;

a supporting structure comprising a central stem having one end disposed on a side of said rotary member opposite said vibration member, the other end of said central stem extending through said rotary member and at least a portion of said vibration member and engaging said vibration member thereby to support said vibration member, said supporting structure being provided on or substantially on the axis of said vibration member and also comprising a biasing member disposed substantially on the same side of said rotary member as said one end of said central stem for biasing said vibration member to press contact said rotary member; and a member for restricting a deviation of said vibration member within a predetermined range.

26. A system driven by a vibration motor as a driving source, comprising:

a vibration member having an axis and including means for generating a vibration wave therein in response to an electrical signal applied thereto;

a rotary member coaxial with said vibration member and arranged to be driven by said vibration wave;

a supporting structure comprising a central stem having one end disposed at least substantially on a side of said rotary member opposite said vibration member, the other end of said central stem extending through said rotary member and at least a portion of said vibration member and engaging said vibration member thereby to support said vibration member, said supporting structure also comprising a biasing member disposed substantially on the same side of said rotary member as said one end of said central stem generating an abutting force for relatively pressing said vibration member against said rotary member, said supporting member being provided on or substantially on the axis of said vibration member; and a transmitting member engaged with an output portion of said rotary member for transmitting a movement of said rotary member to a load of said system.

27. A vibration driven motor comprising:

a vibration member having an axis;

a rotary member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined vibration of said first and second bending vibrations is generated in said vibration member, the combined vibration causing relative movement between said vibration member and said rotary member; and a supporting structure comprising a central stem having one end portion disposed at least substantially on a side of said rotary member opposite said vibration member, the other end portion of said central stem extending through said rotary member and at least a portion of said vibration member and engaging said vibration member thereby to support said vibration member, said supporting structure also comprising a biasing member disposed substantially on the same side of said rotary member as said one end of said central stem, said supporting structure being provided on or substantially on the axis of said vibration member.

28. A system driven by a vibration motor as a driving source, comprising:

a vibration member having an axis;

a rotary member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined vibration of said first and second bending vibrations is generated in said vibration member, the combined vibration causing relative movement between said vibration member and said rotary member;

a supporting structure comprising a central stem having one end portion disposed at least substantially on a side of said rotary member opposite said vibration member, the other end portion of said central stem extending through said rotary member and at least a portion of said vibration member and engaging said vibration member thereby to support said vibration member, said supporting structure also comprising a biasing member disposed substantially on the same side of said rotary member as said one end of said central stem, said supporting structure being provided on or substantially on the axis of said vibration member; and a transmitting member engaged with an output portion of said rotary member for transmitting a movement of said rotary member to a load of said system.

29. A vibration driven motor comprising:

a vibration member having an axis;

a movable member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined vibration of said first and second bending vibrations is generated in said vibration member, the combined vibration causing relative movement between said vibration member and said movable member; and a supporting structure comprising a central stem having one end disposed at least substantially on a side of said movable member opposite said vibration member and coupled to a fixed member, the other end of said central stem extending through said movable member and at least a portion of said vibration member and engaging said vibration member thereby to support said vibration member, the supporting member being provided on or substantially on the axis of said vibration member and also comprising a biasing member disposed substantially on the same side of said movable member as said one end of said central stem biasing said engaging member to press contact said vibration member to said movable member.

30. A vibration driven motor, comprising:

a vibration member having an axis and including means for generating a vibration wave therein in response to an electrical signal applied thereto;

a contact member frictionally engaging said vibration member and arranged to be driven by said vibration wave; and a supporting structure comprising a central stem having one end at least substantially disposed on a side of said contact member opposite said vibration member and coupled to a fixed member, the other end of said central stem extending through said contact member and at least a portion of said vibration member and engaging said vibration member thereby to support said vibration member, said supporting structure also comprising a biasing member disposed substantially on the same side of said contact member as said one end of said central stem generating an abutting force for relatively pressing said vibration member against said contact member, said supporting structure being located on or substantially on the axis of said vibration member.

31. A vibration driven motor, comprising:

a vibration member having an axis;

a movable member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined vibration of said first and second bending vibrations is generated in said vibration member, the combined vibration causing relative movement between said vibration member and said movable member;

a supporting structure comprising a central stem having one end disposed at least substantially on a side of said movable member opposite said vibration member and coupled to a fixed member, the other end of said central stem extending through said movable member and at least a portion of said vibration member and engaging said vibration member thereby to support said vibration member, said supporting member being provided on or substantially on the axis of said vibration member and also comprising a biasing member disposed substantially on the same side of said movable member as said one end of said central stem biasing said engaging member to apply a pressure force between said vibration member and said movable member; and a member for restricting a deviation of said vibration member within a predetermined range.

32. A system driven by a vibration motor as a driving source, comprising:

a vibration member having an axis and including means for generating a vibration wave therein in response to an electrical signal applied thereto;

a movable member coaxial with said vibration member and arranged to be driven by said vibration wave;

a supporting structure comprising a central stem having one end disposed at least substantially on a side of said movable member opposite said vibration member and coupled to a fixed member, the other end of said central stem extending through said movable member and at least a portion of said vibration member and engaging said vibration member thereby to support said vibration member, said supporting structure also comprising a biasing member disposed substantially on the same side of said movable member as said one end of said central stem generating an abutting force for relatively pressing said vibration member against said movable member, said supporting structure being provided on or substantially on the axis of said vibration member; and a transmitting member engaged with an output portion of said movable member for transmitting a movement of said movable member to a load of said system.

33. A vibration driven motor comprising:

a vibration member having an axis;

a movable member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined vibration of said first and second bending vibrations is generated in said vibration member, the combined vibration causing relative movement between said vibration member and said movable member; and a supporting structure comprising a central stem having one end portion disposed at least substantially on a side of said movable member opposite said vibration member and coupled to a fixed member, the other end portion of said central stem extending through said movable member and at least a portion of said vibration member and engaging said vibration member thereby to support said vibration member, said supporting structure also comprising a biasing member disposed substantially on the same side of said movable member as said one end of said central stem, said supporting structure being provided on or substantially on the axis of said vibration member.

34. A system driven by a vibration motor as a driving source, comprising:

a vibration member having an axis;

a movable member coaxial with said vibration member and frictionally engaged with said vibration member;

a first electro-mechanical energy conversion member functionally coupled to said vibration member for generating therein a first bending vibration having a first direction in said vibration member in response to a first applied electrical signal;

a second electro-mechanical energy conversion member functionally coupled to said vibration member for generating therein a second bending vibration having a second direction different from the first direction in response to a second applied electrical signal, whereby a combined vibration of said first and second bending vibrations is generated in said vibration member, the combined vibration causing relative movement between said vibration member and said movable member;

a supporting structure comprising a central stem having one end portion disposed at least substantially on a side of said movable member opposite said vibration member and coupled to a fixed member, the other end portion of said central stem extending through said movable member and at least a portion of said vibration member and engaging said vibration member thereby to support said vibration member, said supporting structure also comprising a biasing member disposed substantially on the same side of said movable member as said one end of said central stem, said supporting structure being provided on or substantially on the axis of said vibration member; and a transmitting member engaged with an output portion of said movable member for transmitting a movement of said movable member to a load of said system.

* * * * *

UNITED STATES PATENT AND TRADEMARK OFFICE
CERTIFICATE OF CORRECTION

PATENT NO. : 5,684,353
DATED : November 4, 1997
INVENTOR(S) : KAZUKI FUJIMOTO, ET AL.

It is certified that error appears in the above-identified patent and that said Letters Patent is hereby corrected as shown below: On the title page, <u>At [56] References Cited</u>

"Tami" should read --Tamai--.

<u>Column 1</u>

Line 43, "interposed should read --interposed therebetween--.

<u>Column 3</u>

Line 17, "d" should read --<u>d</u>--.

<u>Column 4</u>

Line 20, "which," should read --, which--.
Line 21, "of vibration and" should be deleted.

<u>Column 5</u>
Line 61, "Therefore" should read --Therefore,--.

Signed and Sealed this

Twelfth Day of May, 1998

Attest:

BRUCE LEHMAN

Attesting Officer  Commissioner of Patents and Trademarks